United States Patent [19]

Kreisl

[11] 4,063,789
[45] Dec. 20, 1977

[54] SIGNALLING ARRANGEMENT FOR AUTOMOTIVE VEHICLE STEERING WHEELS

[75] Inventor: Walter Kreisl, Wiesthal, Germany

[73] Assignee: Karl Schmidt GmbH, Neckarsulm, Germany

[21] Appl. No.: 738,453

[22] Filed: Nov. 3, 1976

[30] Foreign Application Priority Data

Nov. 4, 1975 Germany .............................. 7534929

[51] Int. Cl.² .......................................... H01R 15/12
[52] U.S. Cl. ................................. 339/3 S; 200/61.56; 339/88 R
[58] Field of Search ..................... 339/3 R, 3 S, 88 R; 200/61.56, 61.55, 61.54

[56] References Cited

U.S. PATENT DOCUMENTS

| | | | |
|---|---|---|---|
| 1,922,493 | 8/1933 | Murray | 339/3 S X |
| 3,712,968 | 1/1973 | Bonn et al. | 200/61.56 |

Primary Examiner—Roy Lake
Assistant Examiner—DeWalden W. Jones
Attorney, Agent, or Firm—Karl F. Ross

[57] ABSTRACT

The hub of a vehicle steering wheel is provided with signaling contacts one of which is connected to a source of electric current through a connector which comprises an upwardly and downwardly movable conductor whose end remote from the contacts is anchored to a solid metal contact finger guided in an insulating sleeve. The insulating sleeve has a cylindrical portion in which the cylindrical shank of the contact finger is guided and defining a clearance around the shank open at an end of the sleeve to accommodate a coil spring which is seated against a shoulder of the sleeve and a head of the shank which bears against a slip ring. The other end of the contact finger, connected to the cable, is a solid body of square cross section guides in a corresponding square cross section passage of the insulating sleeve.

6 Claims, 4 Drawing Figures

SIGNALLING ARRANGEMENT FOR AUTOMOTIVE VEHICLE STEERING WHEELS

FIELD OF THE INVENTION

The present invention relates to a signaling arrangement for the steering wheel of an automotive vehicle, and more particularly to a current-supply connector for such a steering wheel signaling arrangement.

BACKGROUND OF THE INVENTION

A motor vehicle steering wheel is frequently provided with a signaling arrangement, e.g. for operating a horn of the vehicle, which can comprise a pair of spaced apart contacts, one of which is spring biased away from the other and is movable upwardly and downwardly during the making and breaking of the contact to operate a load such as the vehicle horn. To connect this movable contact or even the known movable contact in cases in which the steering wheel itself may be capable of upward and downward movement, e.g. in the case of an adjustable steering wheel, it is a practice to provide a slip ring which is engaged by a contact finger guided in an insulating sleeve mounted in the steering wheel hub. The contact finger is connected by a cable to one of the contacts of the signaling arrangement. The slip ring is connected to a source of electric current.

In such signaling devices it is known to provide the insulating sleeve with a rectangular cross section passage in which the contact finger is axially guided but prevented from twisting, the contact finger heretofore being constituted as a U-section sheet metal body within this rectangular cross section passage of the sleeve and having a tubular configuration at its head engageable with the slip ring. At the cable end of the contact finger, two tongues are bent from the sheet metal contact finger to form stops limiting the displacement of the finger toward the slip ring.

In this arrangement, the connection between the contact finger and the cable lies outside the insulating sleeve to permit the necessary degree of free movement for the stroke of the contact of the signaling arrangement. The connection between the contact finger and the cable is thus not fully reliable and, since the sheet metal contact finger cannot always be made to the desired tolerances and may be deformed by the upward and downward movement, even the operation of the contact finger is frequently unreliable.

OBJECT OF THE INVENTION

It is the object of the invention to provide an improved signaling arrangement for the steering wheel of a motor vehicle and, more especially, an improved connecting arrangement with limited freedom of upward and downward movement for such a signaling arrangement, which obviates the aforementioned disadvantages.

Another object of the invention is to provide a connector for the purposes described in which, even in the rest position of the contact finger, the latter can remain enclosed at its end turned away from the slip ring by the insulating sleeve.

Still another object of the invention is to provide an arrangement of the character described in which the contact finger can be fabricated with narrow tolerances and hence can function more reliably over long periods of time.

SUMMARY OF THE INVENTION

These objects and others which will become apparent hereinafter are attained, in accordance with the present invention, in a steering wheel signaling arrangement for motor vehicles which comprises, in the hub of the steering wheel, a contact bottom and a contact maker spaced from the contact bottom and spring biased away therefrom, one of these two elements is provided with a metallic contact plate juxtaposed with a countercontact carried by the other element, the contact of the contact maker being upwardly and downwardly movable and, in accordance with the invention, being tied electrically to a slip ring which can be provided in the steering post below the hub with an improved connector capable of permitting upward and downward movement of its contact finger.

According to the present improvement, this connector comprises an insulating sleeve mounted in the hub of the steering wheel and slidably receiving the contact finger, the sleeve having an inner passage in which the contact finger is guided and which is formed at its end turned toward the contact arrangement with a circular cross section and at its end turned toward the slip ring with a rectangular cross section, the transition between the rectangular and cross section having an inwardly extending shoulder whose diameter corresponds substantially to the diameter of the cylindrical shank of the contact finger and forms a seat for a coil spring surrounding this shank and bearing upon the head of the contact finger.

According to an improved feature of the invention, the contact finger is a solid metal body, i.e. a massive brass body terminating at its shank end in a head engageable with the slip ring and which preferably is formed as a separate piece which may be screwed into the end of the shank. At its other end, the massive metallic contact finger is formed of a rectangular, preferably square, cross section corresponding to the rectangular cross section of the passage of the sleeve and carrying a sleeve in which the end of a cable is anchored, i.e. by crimping. The other end of the cable can be joined to the respective contact by the usual connector. The sleeve in which the cable end affixed to the contact finger is anchored is advantageously wholly received in the insulating sleeve when the contact finger is in its rest position, i.e. when the spring is fully expanded and the shank is thrust to its maximum extent out of the sleeve. The aforementioned shoulder thus not only serves as a seat for the spring but also as a stop for the square end of the contact finger.

In the system of the present invention, therefore, the cable connector at the contact finger is completely enclosed in the insulating sleeve. The shoulder serves the dual function of limiting the movement of the contact finger toward the slip ring and limiting movement in the opposite direction by retaining the spring. Since the shoulder closely surrounds the cylindrical shank of the contact finger, moreover, it also provides a close tolerance guide for the contact finger.

BRIEF DESCRIPTION OF THE DRAWING

The above and other objects, features and advantages of the present invention will become more readily apparent from the following description, reference being made to the accompanying drawing in which:

FIG. 3 is a cross-sectional view taken along the line III—III of FIG. 1; and

FIG. 4 is a cross-sectional view taken along the line of IV—IV of FIG. 1.

SPECIFIC DESCRIPTION

Figure 1:
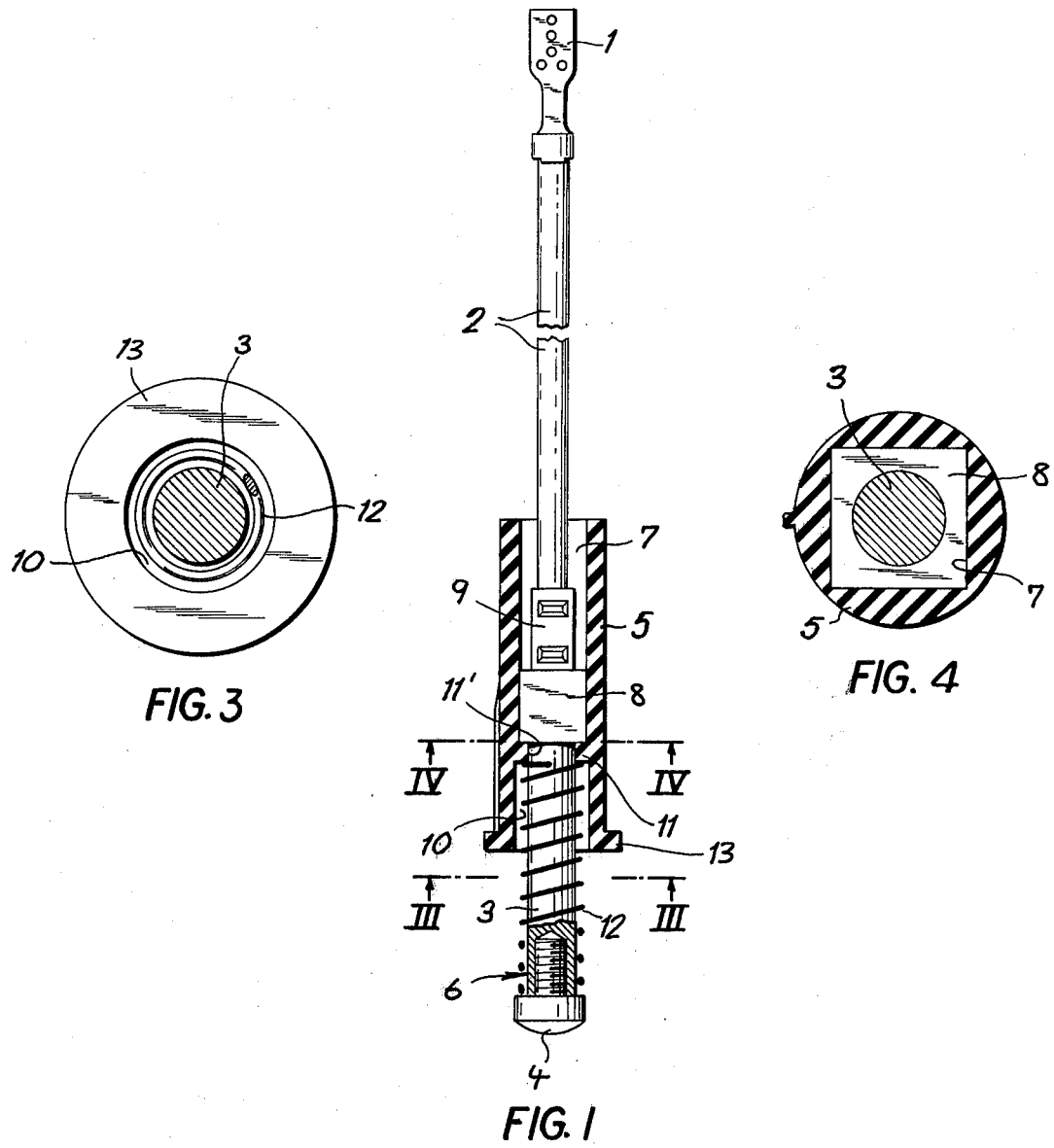
FIG. 1 is an axial cross-sectional view, partly broken away and partly in elevation of a connector for a signal arrangement according to the invention.

As can be seen from FIG. 1, the connector according to the invention comprises a metallic contact plate or terminal 1 which is crimped onto the other end of cable 2 whose other end is crimped in a conductive sleeve 9 fixed to the square-cross section end or body 8 of a contact finger 6.

The contact finger 6 has a cylindrical shank portion 3 into which the head 4 may be threaded and is unitarily formed as a massive brass body with the square-cross section portion 8.

The contact finger 6 is received in an electrically insulating sleeve 5 of cylindrical outer configuration and an inner passage which comprises a cylindrical bore 10 and a square cross section portion 7 separated by a shoulder 11 whose inner bore 11' closely surrounds the cylindrical shank 3. The cylindrical passage portion 10 defines a clearance with the shank 3 sufficient to accommodate a coil spring 12 which is seated on the one hand against the shoulder 11 and, on the other hand, against the head 4. The shoulder 11 also forms a stop for the rectangular portion 8 of the contact finger in the direction of the slip ring, i.e. in the direction of arrow A. The conductive sleeve 9 can be integral with the contact finger as well and is wholly received in the insulating sleeve 5.

Figure 2:
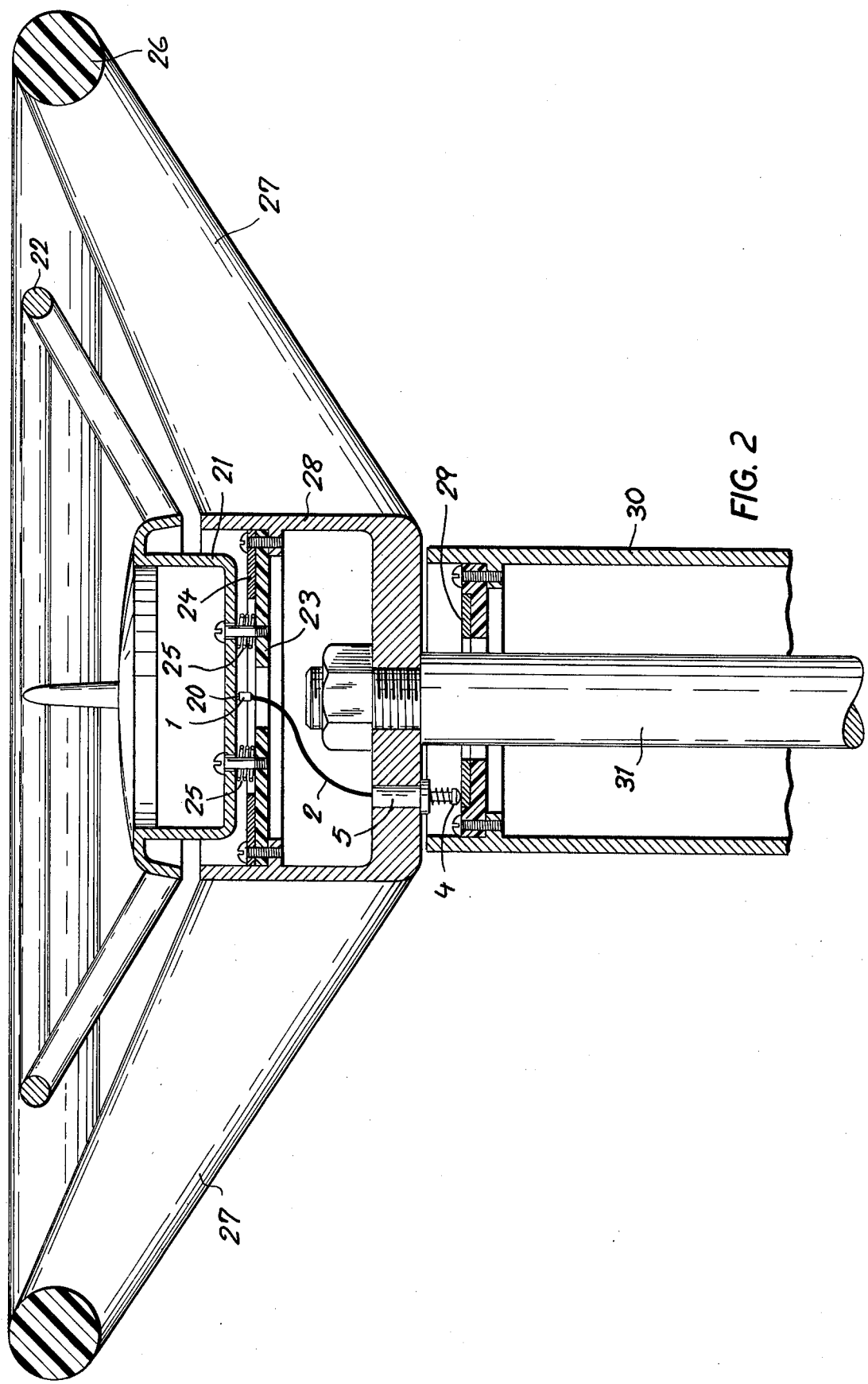
FIG. 2 is a diagrammatic illustration of a signaling arrangement embodying the connector of the present invention.

The connector may be used in a system of the type shown diagrammatically in FIG. 2 in which the steering post 30 carries the slip ring 29 which can be connected to a source of electric current, namely, a terminal of the battery via an insulating circuit. The head 4 is here shown to bear upon the slip ring 29 and to be mounted in the base of the steering wheel hub 28 which has its rim 26 connected by spokes 27 with the hub. The contact maker can be a horn ring shown diagrammatically at 22 and normally biased away from the contact bottom 23 by springs 25. A contact plate 24 on the contact bottom 23 can make contact with the counter-contacts 27 of the contact maker 22 when the latter is actuated. A terminal 20 on the contact maker may be connected to the terminal 1 of the connector 1–12 previously described. A flange 13 can be provided on the sleeve 5.

I claim:

1. A steering wheel connector between a signaling contact arrangement and a slip ring, said connector comprising:

a cable connected at one end to said contact arrangement;

an insulating sleeve received in the hub of the steering wheel and having one end turned toward said contact arrangement, said sleeve formed with a throughgoing internal passage including a cylindrical portion opening at said one end of said sleeve, a rectangular cross section portion opening at said other end of said sleeve, and a peripheral shoulder between said portions and formed with a circular bore;

an upwardly and downwardly movable contact finger slidable in said sleeve, said contact finger having a cylindrical shank guided in said bore and extending through said cylindrical portion out of said sleeve at said other end of said sleeve and formed with a head, a rectangular-section body guide in said rectangular section portion and a connector sleeve formed on said body and secured to the other end of said cable within said insulating sleeve; and a coil spring seated against said shoulder and bearing against said head while surrounding said shank in said cylindrical portion.

2. The connector defined in claim 1 wherein said body is of square section.

3. The connector defined in claim 2 wherein said contact finger is unitarily formed with said shank and said body has a solid metallic structure.

4. The connector defined in claim 3 wherein said head is threaded into said shank.

5. The connector defined in claim 4 wherein said connecting sleeve is formed unitarily on said body.

6. The connector defined in claim 5 wherein said connecting sleeve is crimped onto the said other end of said cable.

* * * * *